(12) United States Patent
Nonweiler et al.

(10) Patent No.: US 6,262,778 B1
(45) Date of Patent: Jul. 17, 2001

(54) IMAGE PROCESSING SYSTEM (75) Inventors: Brian Robert Nonweiler, Newbury; Adam Rae-Smith, Kintbury, both of (GB)

(73) Assignee: Quantel Limited, Newbury (GB)

( * ) Notice: Subject to any disclaimer, the term of this patent is extended or adjusted under 35 U.S.C. 154(b) by 0 days.

(21) Appl. No.: 09/020,932

(22) Filed: Feb. 9, 1998

(30) Foreign Application Priority Data

Mar. 27, 1997 (GB) .................................................. 9706498

(51) Int. Cl.[7] .............................. H04N 9/74; H04N 9/75; G09G 5/00
(52) U.S. Cl. ......................... 348/586; 348/586; 348/587; 348/592; 348/584; 348/590; 348/591; 358/22; 358/21; 345/113; 345/114
(58) Field of Search ................................. 348/584, 586, 348/587, 589, 590, 591, 592; 345/113, 114; 358/21, 22; H04N 9/74, 9/75

(56) References Cited

U.S. PATENT DOCUMENTS

| | | | | |
|---|---|---|---|---|
| 4,393,394 | * | 7/1983 | McCoy | 358/22 |
| 4,408,221 | * | 10/1983 | McCoy | 358/21 |
| 4,514,818 | | 4/1985 | Walker | 364/521 |
| 4,829,455 | | 5/1989 | Long et al. | 364/521 |
| 5,032,901 | * | 7/1991 | Vlahos | 358/22 |
| 5,251,016 | * | 10/1993 | Delwiche | 358/22 |
| 5,313,304 | * | 5/1994 | Chaplin | 348/587 |
| 5,400,081 | * | 3/1995 | Chaplin | 348/587 |
| 5,424,781 | * | 6/1995 | Vlahos | 348/587 |
| 5,630,037 | * | 5/1997 | Schindler | 395/131 |
| 5,737,031 | * | 4/1998 | Tzidon et al. | 348/587 |
| 5,812,214 | * | 9/1998 | Miller | 348/587 |
| 5,940,140 | * | 8/1999 | Dadourian et al. | 348/587 |
| 6,023,302 | * | 2/2000 | MacInnis et al. | 348/597 |

FOREIGN PATENT DOCUMENTS

| | | |
|---|---|---|
| 1369702 | 10/1974 | (GB) . |
| 2086686 | 5/1982 | (GB) . |
| 2089625 | 6/1982 | (GB) . |
| 0171829 | 2/1986 | (GB) . |
| 2260673 | 4/1993 | (GB) . |
| 2267010 | 11/1993 | (GB) . |
| 2273584 | 6/1994 | (GB) . |

* cited by examiner

*Primary Examiner*—Reinhard J. Eisenzopf
*Assistant Examiner*—Paulos Natnael
(74) *Attorney, Agent, or Firm*—Cooper & Dunham LLP (57) ABSTRACT

An image processing system 11 is arranged to produce data representing a combined image from foreground data F representing a foreground subject in front of a chroma backing and background data B representing a background image. The foreground data is processed and color corrected to produce first and second processed foreground data which is combined in a combiner 25 under the control of a first key $K_1$. The background data is processed using a second key $K_2$ to "cut" a "hole" in the background image. The processed background data and the combined foreground data are added together in an adder 44. A third key $K_3$ is used to remove unwanted data from the added foreground and background data and to combine the resulting data with the processed background data in a combiner 45.

21 Claims, 4 Drawing Sheets

IMAGE PROCESSING SYSTEM

FIELD OF THE INVENTION

The invention relates to an image processing system. More specifically the invention relates to an image processing system for processing foreground image data representing pixels that together form a foreground subject in front of a chroma backing and background image data representing pixels that together form an image of a background.

DESCRIPTION OF THE RELATED ART

Image processing systems are known for producing data representing a composite image from data representing an image of a foreground subject in front of a matte or chroma backing and data representing an image of a background. For example European patent application EP-A-171829 describes a system for combining data representing two such images, in which systems data defining a range of colours is used to identify data corresponding to the chroma backing and to replace that data on a pixel-by-pixel basis with the data representing the background image to produce the data representing the composite image.

There are several problems associated with such systems. The image of the foreground subject and matte is normally captured by a camera in a studio with the foreground subject (typically a person) in front of a matte screen. The matte screen should be of a uniform colour (typically saturated blue) but often is not, for example because of an unevenly painted and/or illuminated screen. The foreground subject may contain colours or colour components corresponding with the colour of the matte, for example because of the clothes that the person is wearing or because light from the matte screen is reflected or otherwise spilled onto the foreground subject. The foreground subject may contain fine boundary details, for example stray hairs, which do not present a high contrast to the matte and which are replaced with the background image during creation of the composite image.

SUMMARY

The invention aims to overcome or at least reduce the above identified and associated problems.

According to one aspect of the invention there is provided an image processing system in which: foreground image data representing pixels that together form an image of a foreground subject in front of a chroma backing is processed to produce first processed foreground data representing pixels that together form a colour corrected image of the foreground subject in front of the chroma backing and second processed foreground data representing pixels that together form an image of the foreground subject in front of a null backing; the first and second processed foreground data is combined under the control of data representing pixels that together form a control image, to produce combined foreground data representing pixels that together form an image of the colour corrected foreground subject in front of the null backing; background image data representing pixels that together form an image of a background is processed to produce processed background image data representing pixels that together form an image of the background with one or more null portions at areas corresponding in position to that of the foreground subject in the image represented by the foreground image data; and the combined foreground data and the processed background data are added together to produce data representing pixels that together form an image of the colour corrected foreground subject in front of the background.

According to another aspect of the invention there is provided an image processing system in which: foreground image data representing pixels that together form an image of a foreground subject in front of a chroma backing is processed to produce first processed foreground data by varying the data to change the colour of pixels represented thereby so that the data represents pixels that together form a colour-changed image of the foreground subject in front of the chroma backing, and to produce second processed foreground data by offsetting the data so that the data for pixels corresponding to the chroma backing are set to a pedestal level and then varying the thus offset data so that the data represents pixels that together form a colour-altered image of the foreground subject in front of a null backing; and the first and second processed foreground data is combined, under the control of data representing pixels that together form a first control image, to produce combined foreground data representing pixels that together form an image of a combination of the colour-changed foreground subject and the colour-altered foreground subject in front of the null background.

The invention also provides an image processing system in which: foreground image data representing pixels that together form an image of a foreground subject in front of a chroma backing is processed by varying the data to change the colour of pixels represented thereby to produce processed foreground image data representing pixels that together from a colour-changed image of the foreground subject in front of a null backing; background image data representing pixels that together form an image of a background is processed to produce processed background image data representing pixels that together form an image of the background with one or more null portions at areas corresponding in position to that of the foreground subject in the image represented by the foreground image data; the processed foreground data and the processed background data are added together to produce added data representing pixels that together form an image of the colour-changed foreground subject in front of the background and the null background; keying data is generated representing pixels that together form a keying image defining one or more areas containing the foreground subject as represented by the added subject data; and the background image data and the added data are combined under the control of the keying data to produce combined image data representing pixels that together form an image of the colour-changed foreground subject in front of the background.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

In the drawings.

DETAILED DESCRIPTION

Figure 1:
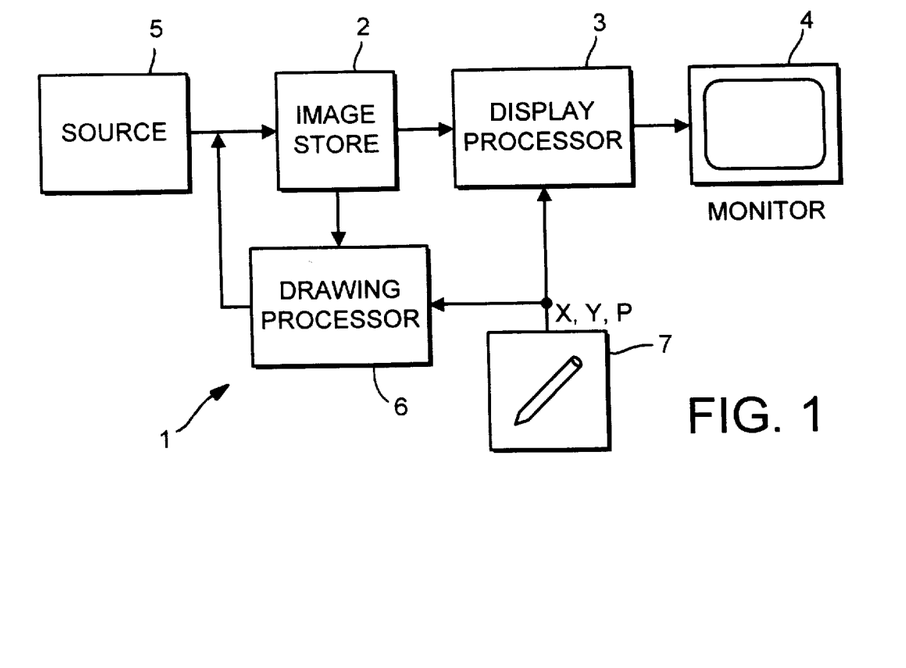
FIG. 1 a schematic diagram of an image processing system.

Referring now to FIG. 1 of the accompanying drawings, an image processing system indicated generally at 1, comprises an image store 2 for storing data defining one or more images, a display and control processor 3 and a monitor 4. The contents of the image store 2 are read continuously in raster sequence via a serial access port by the display processor 3 and the thus scanned data is output by the display processor 3 for display of the image represented thereby on the monitor 4.

Data representing an image may be input to the image store 2 from a source 5, which may for example be another image store, a random access frame store such as described in British patent application no. GB-A-2273584 and corresponding U.S. patent application Ser. Nos. 08/162,645 now abandoned and 08/773,613 now U.S. Pat. No. 5,765,186 issued Jun. 9, 1998 all of which are incorporated herein by reference, a video tape recorder, a camera, etc. Alternatively, or additionally, data may be created in the image store 2 by a drawings processor 6 in response to user manipulation of a user operable stylus/touch tablet device 7. The display and control processor 3 and the drawing processor 6 are shown as separate entities in order to facilitate understanding by simplifying the following explanation. In practice the two processors 3, 6 may be provided as a single processing unit.

The display and control processor 3 is arranged to display a menu of options (not shown) by which the user may select and vary parameters used by the system in processing image data. The menu may include such options as a pallette of colour and a set of drawing implements from which the user may select during "painting", a video time line from which the user may select individual video frames for processing, and a set of value boxes by which the user may define values to be used during the processing of image data.

The drawing processor 6 is arranged to modify the image data in the store 2, and hence the image represented thereby in response to user manipulation of the stylus/touch tablet device 7. As the stylus is drawn across the touch tablet signals representative of the instantaneous position X, Y of the stylus are output to the display processor 3 and a drawing processor 6.

The drawing processor 6 converts the X, Y data from the touch tablet into x, y data identifying patches of store addresses in the store 2. Each patch of addresses is centered over the location in the store equivalent to the corresponding X, Y position data generated by the touch tablet.

The stylus of the stylus/touch tablet device 5 also includes a pressure sensor that outputs a pressure related signal for use as a parameter by the display processor 3 and drawing processor 6. Modern stylus touch tablet devices are also capable of generating data defining the orientation (twist) and defining the angle of the stylus in relation to the touch tablet. These parameters may be used as well as or instead of the pressure data in the stylus register for use by the processors.

Notional drawing implements and colours are predefined in the system 1 and are selectable by the user from the menu of options (not shown) generated by the display processor 3 and displayed on the monitor 4. When the user selects a displayed implement and colour, data defining a continuous three dimensional shape covering a patch of pixels and representing the profile of the implement and data representing the selected colour is used by the drawing processor 6 together with position and pressure data from the stylus/touch tablet device to simulate "painting" as described for example in British Patent No. 2089625 and corresponding U.S. Pat. No. 4,514,818 both of which are incorporated herein by reference.

Figure 2:
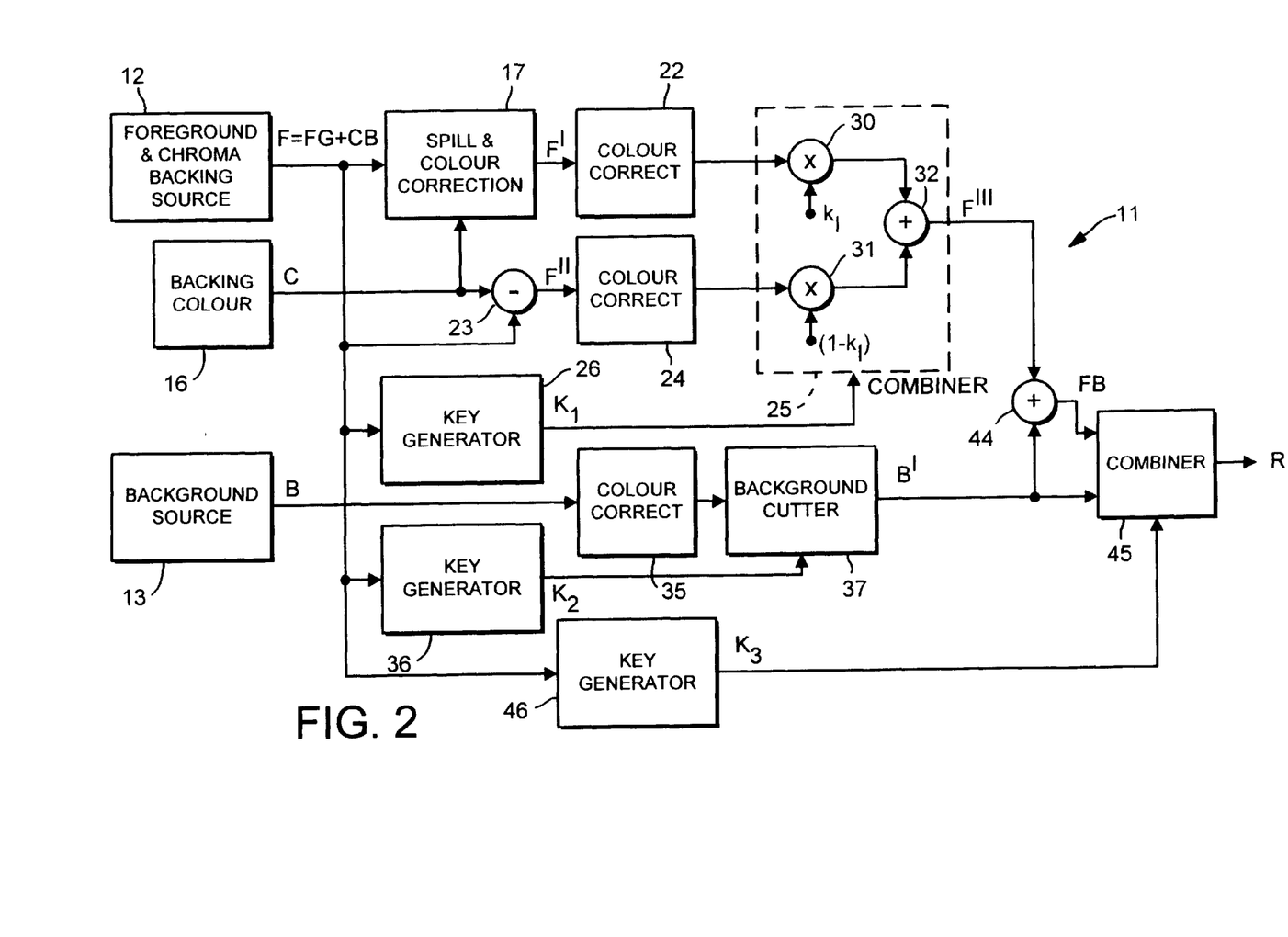
FIG. 2 is a schematic diagram of the image processing system configured to combined data representing a foreground image with data representing a background image.

The system 1 may be used to process still pictures or to process moving pictures on a frame-by-frame basis. The system may also be used to combine two pictures (either moving or still) in which one picture comprises a foreground subject in front of a matte (or chroma) backing (i.e. a backing of substantially uniform colour) and the other picture comprises a background to replace the matte background. FIG. 2 of the accompanying drawings shows the system 1 suitably configured to combine data representing two such pictures in order to produce a composite image.

Turning now to FIG. 2, the system 11 when configured as shown therein comprises a foreground and chroma backing image data source 12 (hereinafter "foreground source") and a background image data source 13 (hereinafter "background source"). The foreground and background sources 12, 13 may be the single source 5 shown in FIG. 1 or may be a combination of for example image stores, video tape recorders, cameras, etc.

Figure 3:
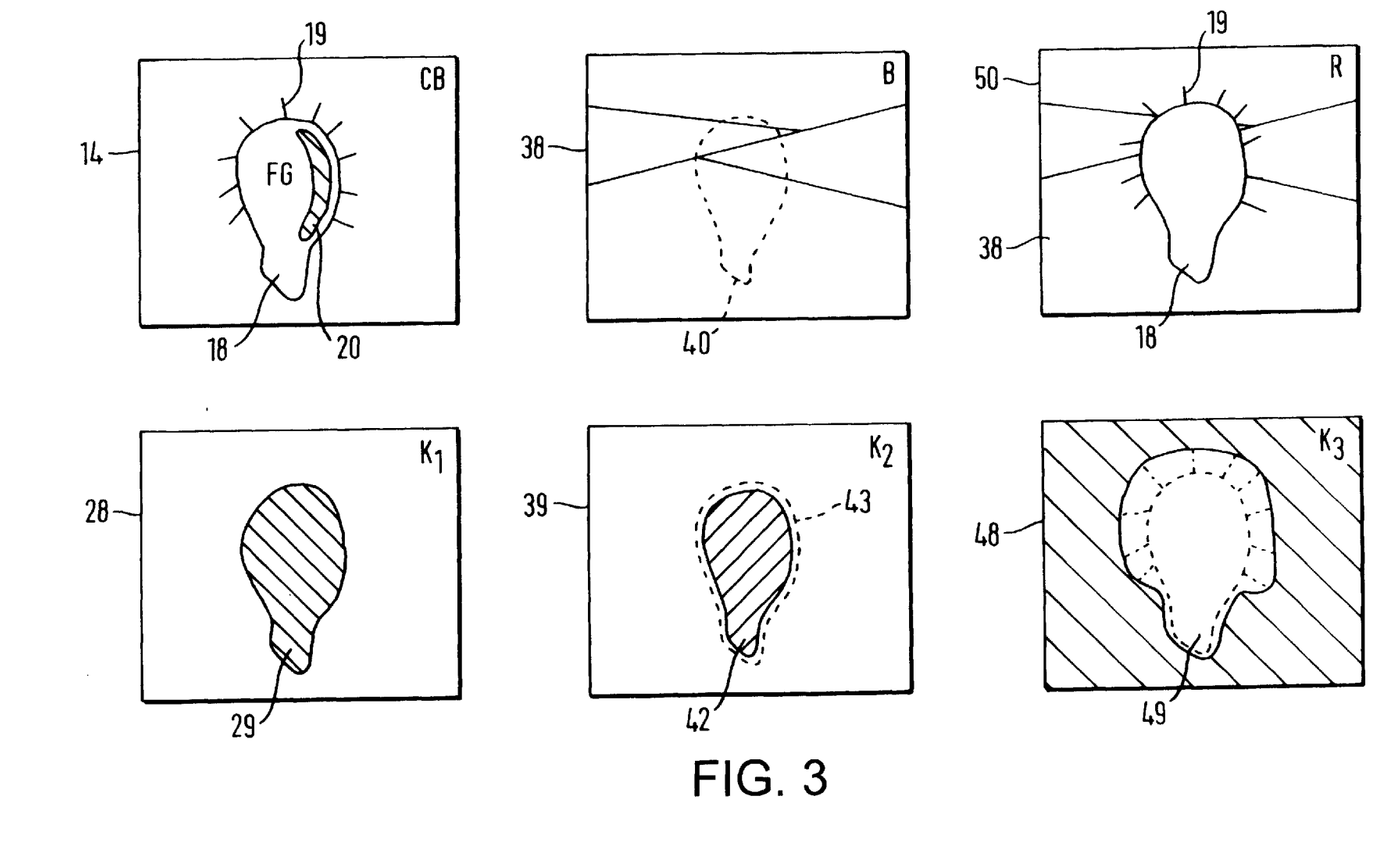
FIG. 3 illustrates various images represented by data within the system of FIG. 2.

As shown in FIG. 3, the data F from the foreground source 12 represents a foreground image 14 comprising two image components, namely the foreground subject FG (for example the head of a person) and a chroma or matte backing CB, i.e. F=FG+CB. In the following it will be assumed that the chroma backing is saturated blue, because this is a colour that is commonly used. It should be noted that other colours, such as green, maybe used as the chroma colour and that the system is of course not limited to the use of a blue backing. The data from the background source represents an image 15 of a background B in front of which the foreground subject FG is to be placed.

Returning to FIG. 2, the system 11 also comprises a backing colour store 16 which stores colour data representing the colour C of the chroma backing CB. The backing colour store 16 may contain data C representing a single colour, a range of colours, or indeed a control image that identifies on a pixel-by-pixel basis data corresponding to the matte backing pixels CB in the data from the foreground source 12. In the interest of simplifying the following explanation it will be assumed that the data C in the backing colour store 16 represents a single colour, since it will be readily appreciated by those possessed of the appropriate skill from consideration of the above referenced EP-A-171892 how the system 11 may be modified to accommodate data defining a range of colours or a control image.

Colour data may be selected for storage in the colour store for example by selecting a pixel from the image of the chroma backing CB as representing the colour of the backing. This selection may be made for example by displaying the image represented by the data in the foreground source 12 on the monitor 14 and then manipulating the stylus/touch tablet device 7 to place a cursor (not shown) over the representative pixel, thereby selecting the pixel.

Data from the foreground source 12 is input to a spill and colour corrector 17 which operates under user control to correct for colour spill in the foreground image 14. Colour spill may occur for example during the capture of the image 14 for example because of reflection of light from the chroma backing CB onto the foreground subject FG, lens flare within the camera, or "bleaching" of the film during processing. As a result the data representing the foreground subject FG may include a blue component or "spill" from the chroma backing.

For example, as illustrated in FIG. 3, the foreground subject FG in the image 14 may be the head 18 of a person. The person is assumed to have hair (not shown) including some stray hairs 19. The head 18 may include a blue spill area 20 and if the person's hair is of a light colour, e.g. blond, it too may include a blue spill component. Blond hair is referred to herein solely as an example of fine detail which can be lost in a crude keying process. Similar problems occur with any features of fine detail including for example the rigging in a tall ship or a spiders web. Problems also occur with semi-transparent objects such as bubbles, the wings of a fly or a silk cloth.

The spill and colour corrector 17 performs two operations. Firstly, using the colour data C in the backing store 16, the corrector 17 removes blue spill from the foreground data FG, while leaving the blue content of the chroma backing data CB unaltered. Secondly, the corrector 17 adjusts the colour content of the image data to compensate for the changes made to that data in removing the blue spill in the image represented thereby. This two-part correction is necessary in order to avoid producing data representing the foreground subject with too little blue content. For example removing blue from blond hair will leave the hair looking grey. The colour content of the data is therefore also adjusted (for example changing the red and green content of the image data to change the colour of the greyed hair toward yellow) so that the colour of the person's hair is brought closer to the original blond. The spill and colour corrector 17 will be described in further detail hereinafter.

The data from the spill and colour corrector 17 is input to a colour corrector 22 which is provided to enable a user of the system to make further corrections to the data F representing the overall image 14, if desired, so as to produce data F' representing a spill and colour corrected image of the foreground subject and the chroma backing.

The data F' produced in this way represents the foreground subject in substantially the correct colour, i.e. with the blue spill removed therefrom. The fine details such as the stray hairs 19 may, however, become lost or partially obscured in the chroma backing. Such fine details are recovered by processing the data from the foreground source 12 separately in a different manner as will now be described.

The data from the foreground source 12 and the data C from the backing colour store 16 are also input to a subtracter 23 which subtracts the backing colour C from all of the foreground data F in one of two ways depending on the desired result to produce a foreground image in front of a null backing, as will be described below. Normally, the subtracter 23 simply subtracts the colour value C from the values of pixels represented by the foreground of data F. With the subtracter operating in this way subtracting the colour data from pixel data corresponding to the chroma backing CB will produce pixel data with a zero value, i.e. data corresponding to the colour black, because C=CB. Subtracting the colour data C from pixel data corresponding to the foreground subject FG will produce pixel data representing a falsely coloured foreground subject FG".

The data F" from the subtracter 23 is input to a colour corrector 24 which normally multiplies the pixel values represented by the data F" by a factor that increases the values. The effect of the converter 24 is to leave at black pixels corresponding to the backing CB (because the value of those pixels is at zero) and to increase the colours of the pixels in the falsely coloured foreground FG". Thus, when operating in this way the colour corrector 24 serves to increase the intensity of the foreground subject, i.e. the head 18 and stray hairs 19 as shown in FIG. 3.

The colour corrector 24 may also adjust the colour of the foreground subject FG" to compensate for the blue component removal. Again considering blond hair, the red and green components may be adjusted to change originally blond hair that has been turned grey back towards a yellow colour that is closer to the original blond. Thus, with the subtracter operating in this way the darkening effect of subtracting blue from, for example, blond hairs is compensated so that the blond hairs do not become lost against a dark background.

There are, however, circumstances when it is not desirable to adopt this operation. For example, in real life when a person with blond hair is viewed against a bright sky, the eye of the observer automatically compensates for the contrast between sky and hair and as a result the hair appears darker than the sky. An image in which blond hair is lighter than a bright background will appear artificial because that is not how the scene would be viewed in real life. The subtracter 23 may therefore be configured to subtract a value less than the value of the colour data C from the values of the pixels in the foreground image data.

In digital television the colour black is not represented by the value zero but is instead represented by the value of 16 or below. The subtracter 23 is arranged to subtract from the foreground data F a colour value that will leave each of the pixels corresponding to the chroma backing CB in the data F" at a value less than or equal to a predetermined value. In other words the value of the data is raised up to a pedestal level corresponding to the predetermined value. We have found that selecting the predetermined value, i.e. the pedestal, to be 32 achieves acceptable results. With the subtracter 23 operating in this way, the colour corrector 24 is arranged to multiply the pixel data from the subtracter 23 as previously described and then to subtract an offset which brings the value of pixels corresponding to the chroma backing back down to 16 or below. The effect of this is to darken blond hairs so that the desired contrast can be achieved against a light background. Flesh tones may be adjusted by the colour corrector 24 varying, say, the magenta component of the image data F".

The spill and colour corrected image data F' and the colour corrected falsely coloured image data F" are input to a combiner 25 together with keying data $K_1$ generated by a key generator 26. The keying data $K_1$ represents a control image 28 which, as shown in FIG. 3, distinguishes between pixel data of the foreground FG and pixel data of the chroma backing CB in the image data F from the foreground source 12.

The generation of such keying data is well known and need not be described in detail herein. It is sufficient to say that the keying data $K_1$ is generated by the key generator 26 examining the colour of each pixel and assigning a value of zero to pixels of a blue colour corresponding to the blue of the chroma backing and assigning a value of one to pixels of other colours. This approach produces two distinct regions in the keyer, one of value zero and the other of value one, with a hard edge between the two regions. As is well known, the edge between the regions may be "softened" by assigning to pixels in the vicinity of the hard edge key values between zero and one so as to give a gradual transition between the regions.

Thus the key generator 26 generates keying data $K_1$ which, as shown in FIG. 3, defines a control image 28 that identifies a region 29 corresponding to the head 18 but excluding the stray hairs 19 of the foreground image 14. The keying data $K_1$ is input to the combiner 25 where it is used to combine selectively the data of the spill corrected foreground image F' with the data of the falsely coloured image F" to produce foreground image data F'".

As can be seen in FIG. 2, the combiner 25 comprises a first multiplier 30 that multiplies the signal F' by the key data $K_1$, and a second multiplier 31 that multiplies the signal F" by data $(1-K_1)$ derived from the key data $K_1$. An adder 32 adds together the thus weighted signals from the multipliers 30, 31 to produce the foreground image data F'" as a weighted summation of the signals F' and F". Thus the combiner 25 produces the signal F'" in accordance with the equation $$F'''=K_1 F'+(1-K)F'' \qquad (1)$$

The control image 28 defined by the key data $K_1$ has a value of zero outside the region 29 and has a value of one inside the region. The key data $(1-K_1)$ represents the inverse, that is $(1-K_1)$ has a value of one outside the region 29 and a value of zero inside. Ignoring the "soft" transition at the boundary of the region 29, the effect of the combiner 25 is to add the spill corrected data corresponding to the head 18 with the colour corrected data corresponding to the stray hairs 19 with a black background. Thus, the data F'" output from the combiner 25 represents the foreground subject, i.e. the head 18 and stray hairs 19, against a black background.

The background data B from the background source 13 is input to a colour corrector 35 which, optionally, enables the user to correct the colour of the background image represented by the background data B. It may for example be desirable to adjust the colour of the background so that the subject of the background better offsets the foreground subject. A second key generator 36 is arranged to generate a second key data $K_2$ which is used by a background cutter 37 to cut a "hole" in the image represented by the background data B. That is to say, the background cutter 37 responds to the key data $K_2$ by outputting data for pixels in some regions unaltered and for outputting data for pixels in other regions (i.e. the "hole") with the data set to zero, i.e. representing the colour black.

FIG. 3 of the accompanying drawings shows a second control image 38 represented by the second key data $K_2$. The control image 38 may be identical to the control image 28. FIG. 3 also shows an exemplary background image 39. In the case where the two control images 28 and 38 are the same, the two keys $K_1$ and $K_2$ will be the same and the background cutter 37 will respond to the key $K_2$ by producing modified background data B' representing the background image 39 with a hole (represented by the broken line 40) in the background image that is identical to the region 29 in the control image 28.

This approach, however, can result in unwanted artifacts being produced between the foreground and the background when the foreground and background data is combined. For example a black line may be visible at the boundary between the foreground and the background. Clearly, this is undesirable. In order to avoid such unwanted artifacts the key generator 36 may be arranged to generate the key data $K_2$ so that it defines a hole 40 that lies within the foreground subject, i.e. the head 18. As shown in FIG. 3, the control image 39 represented by the key signal $K_2$ defines a region 42 that lies within a boundary 43 corresponding to broken line 40 in the background image 39 and to the region 29 in the first control image 28.

One way in which the key data $K_2$ may be generated is by processing the key data $K_1$ to "grow" the control image represented thereby either positively or negatively, as described in our British Patent Application No. GB-A-2260673 and corresponding U.S. patent application Ser. No. 07/961,291, the teachings of which are incorporated herein by reference. Another way in which the key data $K_2$ may be generated is by the generator 36 processing the foreground data F using different parameters to detect the boundary between the foreground FG and the chroma background CB.

The modified background plus hole image data B' and the new foreground data F'" are input to an adder 44 where the data is added together to produce data FB representing the foreground subject in front of the background. This data FB is input together with the background data to a combiner 45 where the data is combined depending on a key $K_3$ generated by a third key generator 46.

As has already been mentioned, matte backgrounds are not always of a uniform colour. Consequently, the black areas in the new foreground image represented by the new foreground data F'" may not correspond to black exactly. That is to say, the data may include noise which will result in some parts of the original matte showing through in the black that should have replaced the matte. If the data F'" and B' is simply added together by the adder 44, then the image represented by the resulting data will include parts of the matte showing through the background. The key generator 46 and the combiner 45 together enable this problem to be overcome.

As shown in FIG. 2 the key generator 46 is connected to receive the foreground data F from the foreground source 12 and to generate a third key signal $K_3$ therefrom. The key generator 46 may be arranged to generate the key data $K_3$ in a similar manner to that already described with respect to the key generators 26 and 36. The key generator 46 may also generate the key data $K_3$ by identifying pixels in the foreground data F corresponding to the foreground subject FG and the chroma backing CB respectively, by generating a key therefrom and then applying a "blur" or "grow" function to the generated key in order to produce data representing a blurred control image, such as the image 48 shown in FIG. 3, as the keying signal $K_3$. Any of the well known and widely available blurring functions may be used.

In addition to blurring the control image, the key generator 46 may comprise a so-called HICON filter which produces a high contrast in the control image. A HICON filter works by pulling all signal values below a first selected value down to zero, and pulling all signal values above a second selected value up to one. The closer the two selected values are to each other, then the greater will be the contrast, but also the sharper will be the transition between regions in the control image. Conversely, the further the two selected values are from each other, then the lesser will be the contrast and the softer will be the transition. Providing user control over the selected values thus enables the user to make a judgement as how best to create the key by the HICON filter. Another alternative would be to allow the user to generate as the key $K_3$ a control image using the above mentioned "painting" functions of the system.

The key data $K_3$, however created, defines an area 49 containing the entire foreground subject FG including the stray hairs 19. The key data $K_3$ causes the combiner to combine the colour corrected background B' from the background cutter 37 with the added signal FB from the adder 44 to produce a result R in accordance with the equation $$R=K_3 B'+(1-K_3)FB \qquad (2)$$

It will be appreciated from the above equations (1) and (2) that the combiner 45 has the same internal structure as the combiner 25.

As shown in FIG. 3 the result data R represents an image 50 comprising the person's head 18 with stray hairs 19 in front of the background 38. This result is achieved because for values of $K_3=1$, i.e. outside the area 49, the output data R will correspond to the colour corrected background B', and for values of $K_3=0$, i.e. inside the area 49, the output data R will correspond to the added signal FB representing the foreground subject FG" (i.e. the head 18 with stray hairs 19) and the background B' with chroma backing noise. If the chroma backing is of an uneven colour (i.e. the colour is dirty or the data is noisy) in the vicinity of the foreground subject then the boundary of the area 49 should be as close a possible to the foreground subject, but if the chroma backing is of a reasonably even colour in the vicinity of the foreground subject then the boundary of the area need not be as close. Clearly, the evenness of the backing in the vicinity of the foreground subject will influence the user's selection of the method by which the key signal $K_3$ is generated or produced by the key generator 46.

The spill and colour corrector 17, and indeed any or all of the colour correctors 22, 24 and 35 may comprise a user configurable look up table arranged to define a so-called colour cube such as is described in British Patent No. GB-A-1369702 which is incorporated herein by reference.

Figure 4:
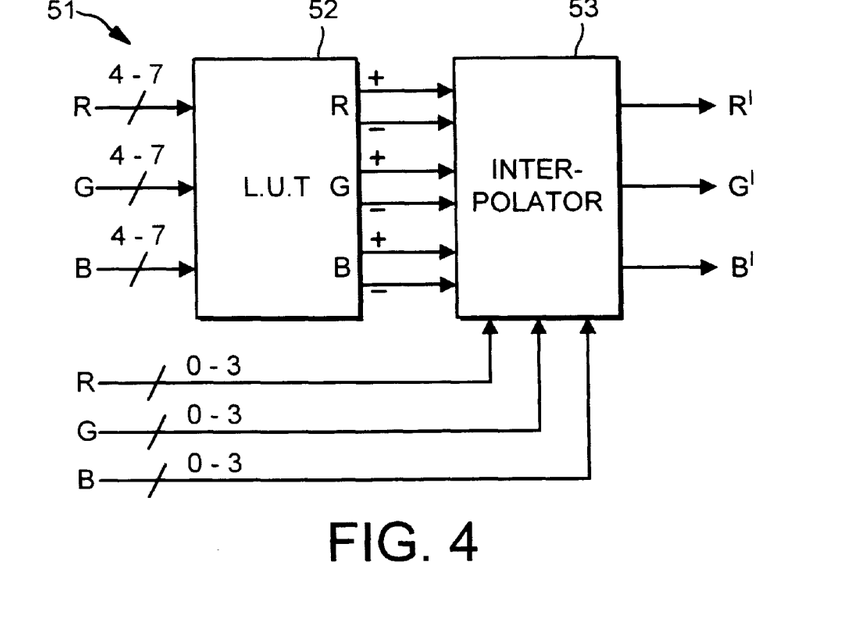
FIG. 4 is a schematic diagram of a colour cube circuit.

In general terms, as shown in FIG. 4 of the accompanying drawings, a colour cube circuit 51 comprises a look up table 52 and an interpolator 53. As shown in FIG. 4 an output R'G'B' colour is derived from input RGB colour components. Each component is represented by an eight-bit binary number. The four most significant bit (bits 4–7) of each of the RGB colour components are input to the look up table 52. Since only the four most significant bits of the RGB colour component data is used the colour definition is relatively coarse. The look up table is therefore arranged to output two values for each of the R'G'B' colour components, the two values of each component defining a range of colour within which the desired colour is located. The two values for each of the R'G'B' colour components are represented by the symbols $R^{30}$ and $R^-$, $G^+$ and $G^-$, $B^+$ and $B^-$ in FIG. 4 and between them define the corners of a cube in R'G'B' colour space.

Figure 5:
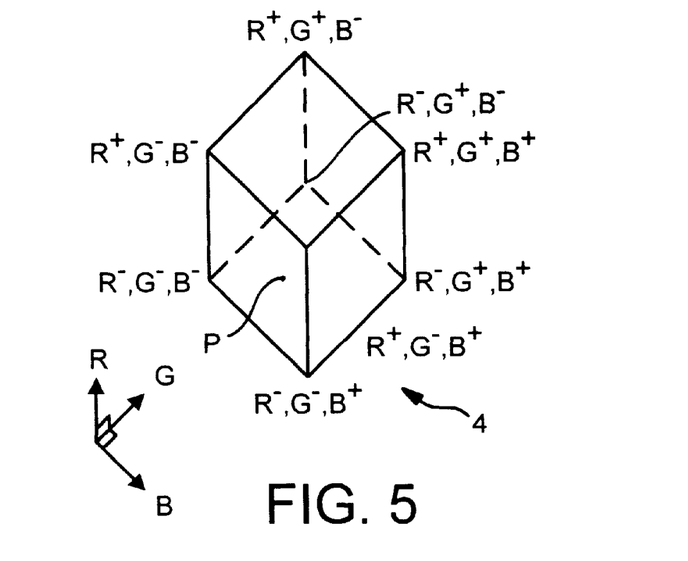
FIG. 5 is a schematic diagram of a colour cube in colour space.
Figure 6:
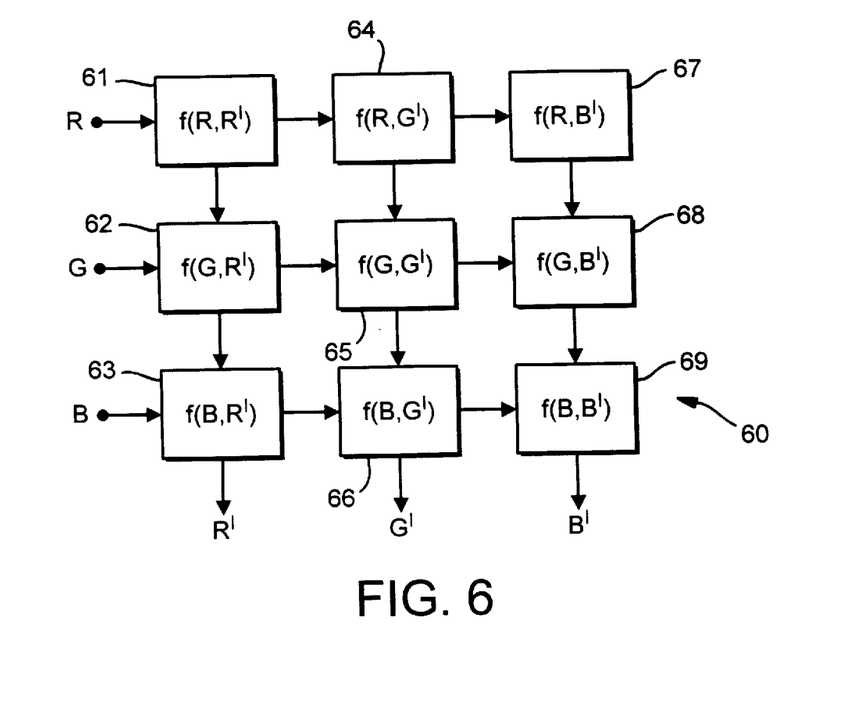
FIG. 6 is a schematic diagram of a colour converter matrix.

FIG. 5 of the accompanying drawings shows a cube 54 in R'G'B' colour space having corners at coordinate positions defined by the values $R^+$ and $R^-$, $G^+$ and $G^-$, $B^+$ and $B^-$. The actual colour defined by the input RGB colour data is at a point P somewhere within the cube 54 and the exact coordinates of the point can be determined by interpolating between the values $R^+$ and $R^-$, $G^+$ and $G^-$, $B^+$ and $B^-$, the values being input to the interpolator 53. The four least significant bits (bits 0–3) of the RGB colour component data are also input to the interpolator 53 and are used therein to calculate interpolation weighting coefficients which are applied to the values $R^+$, $R^-$ and $G^+$, $G^-$ and $B^+$, $B^-$ to find the exact values of R'G' and B' that represent the colour at the point P. More detailed description of a colour cube circuit can be found in GB-A-1369702.

As shown in FIG. 5 some or all of the correctors 17, 22, 24, 35 may comprise a matrix 60 of look up tables 61 to 69 which together convert input colour signal components RGB into corrected output colour signal components R'G'B'. While RGB format signals are shown in FIG. 5 other formats such as (you, magenta, yellow (and black) CMY(K) or chrominance and luminance YUV may be used within the system and the matrix 60 would be constructed accordingly. Each of the look up tables 61 to 69 defines a respective transfer function whose form can be changed simply by loading the look up tables 61 to 69 with different values. The construction of a matrix similar to that shown in FIG. 5 is disclosed in European patent application published as EP-A-245943 and corresponding U.S. Pat. No. 4,829,455 the teachings of which are incorporated herein by reference.

Parameters used to generate the data for the colour cube look up table or the colour matrix look up tables are input by way of a menu of options (not shown) displayed on the monitor 4 (see FIG. 1). In response to manipulation of the stylus/touch tablet device 7, the control and display processor 3 applied such parameters as maximum, minimum or fixed values of red, green and blue colour components, colour changes and colour difference values as selected by the user to calculating data for the look up table. In this way user control of the corrections is effected.

The various correctors 17, 22, 24, 35 within the system 11 are conceptually separate and have been represented by different units in FIG. 2. In practice, the correctors 17, 22, 24, 35 may be provided in a single corrector unit capable of performing all of the necessary correcting functions. In such a unit the appropriate functions would be selectable for the required correction. Similarly the several conceptually separate key generators 26, 36, 46 may be provided by a single key generating unit. The choice of a single unit or several separate units is one of implementation convenience and has no bearing on the invention as such.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. An image processing system in which:

foreground image data representing pixels that together form an image of a foreground subject in front of a chroma backing is processed to produce first processed foreground data representing pixels that together form a colour corrected image of the foreground subject in front of the chroma backing and second processed foreground data representing pixels that together form an image of the foreground subject in front of a null backing;

the first and second processed foreground data is combined, under the control of first control data representing pixels that together form a first control image, to produce combined foreground data representing pixels that together form an image of the colour corrected foreground subject in front of the null backing;

background image data representing pixels that together form an image of a background is processed, under the control of second control data representing pixels that together form a second control image, to produce processed background image data representing pixels that together form an image of the background with one or more null portions at areas corresponding in position to that of the foreground subject in the image represented by the foreground image data; and the combined foreground data and the processed background data are added together to produce data representing pixels that together form an image of the colour corrected foreground subject in front of the background.

2. An image processing system as claimed in claim 1, wherein the first control image is different than the second control image.

3. An image processing system as claimed in claim 1, wherein the first and second control data are derived by processing the foreground image data.

4. An image processing system as claimed in claim 1, wherein the foreground subject of the colour corrected image is colour corrected to remove colour spill from the chroma backing.

5. An image processing system as claimed in claim 1, wherein the second processed foreground data is processed to represent pixels that together form a colour altered image of the foreground subject in front of the null background.

6. An image processing system as claimed in claim 5, wherein the first control data defines a control image comprising a portion including control image pixels corresponding to some of the pixels relating to the foreground subject in the colour altered image and a portion including control image pixels corresponding to some of the pixels relating to the foreground subject in the colour corrected so that the combined foreground data represents pixels including some of the colour altered image pixels and some of the colour corrected image pixels.

7. An image processing system in which:

foreground image data representing pixels that together form an image of a foreground subject in front of a chroma backing is processed to produce first processed foreground data by varying the data to change the colour of pixels represented thereby so that the data represents pixels that together from a colour-changed image of the foreground subject in front of the chroma backing, and to produce second processed foreground data by offsetting the data so that the data for pixels corresponding to the chroma backing are set to a pedestal level and then varying the thus offset data so that the data represents pixels that together form a colour-altered image of the foreground subject in front of a null backing; and the first and second processed foreground data is combined, under the control of data representing pixels that together form a first control image, to produce combined foreground data representing pixels that together form an image of a combination of the colour-changed foreground subject and the colour-altered foreground subject in front of the null background.

8. An image processing system as claimed in claim 7, wherein the combined foregoing data is combined with data representing a background image under the control of data representing pixels that together form a second control image to produce data representing pixels that together form an image of the colour-changed and colour-altered foreground subject in front of the background.

9. An image processing system as claimed in claim 7, wherein the colour-changed image includes a portion from which colour spill has been removed.

10. An image processing system as claimed in claim 9, wherein the colour spill is removed by subtracting from the data representing pixels containing colour spill a colour value derived from the colour value of data representing a pixel of the chroma backing.

11. An image processing system as claimed in claim 10, pixels containing colour spill are identified by identifying data representing pixels of a colour value not equal to the colour value of a pixel of the chroma backing and including a colour component corresponding to the colour of the chroma backing which component has a value greater than a predetermined level.

12. An image processing system as claimed in claim 7, wherein the pedestal level is greater than a level corresponding to the level black and the data relating to the null backing represents black pixels.

13. An image processing system in which:

foreground image data representing pixels that together form an image of a foreground subject in front of a chroma backing is processed by varying the data to change the colour of pixels represented thereby to produce processed foreground image data representing pixels that together from a colour-changed image of the foreground subject in front of a null backing;

background image data representing pixels that together form an image of a background is processed to produce processed background image data representing pixels that together form an image of the background with one or more null portions at areas corresponding in position to that of the foreground subject in the image represented by the foreground image data;

the processed foreground data and the processed background data are added together to produce added data representing pixels that together form an image of the colour-changed foreground subject in front of the background and the null background;

keying data is generated representing pixels that together form a keying image defining one or more areas containing the foreground subject as represented by the added subject data; and the background image data and the added data are combined under the control of the keying data to produce combined image data representing pixels that together form an image of the colour-changed foreground subject in front of the background.

14. An image processing system as claimed in claim 13, wherein the keying data is generated by processing the foreground image data.

15. An image processing system as claimed in claim 13, wherein the keying data is generated under user control.

16. An image processing apparatus comprising:

a first processor for processing foreground image data representing pixels that together form an image of a foreground subject in front of a chroma backing to produce first processed foreground data representing pixels that together form a colour corrected image of the foreground subject in front of the chroma backing and second processed foreground data representing pixels that together form an image of the foreground subject in front of a null backing;

a first combiner for combining the first and second processed foreground data, under control of first control data representing pixels that together form a first control image, to produce combined foreground data representing pixels that together form an image of the colour corrected foreground subject in front of the null backing;

a second processor for processing background image data representing pixels that together form an image of a background, under control of second control data representing pixels that together form a second control image, to produce processed background image data representing pixels that together form an image of the background with one or more null portions at areas corresponding in position to that of the foreground subject in the image represented by the foreground image data; and a second combiner for combining the combined foreground data and the processed background data together to produce data representing pixels that together form an image of the colour corrected foreground subject in front of the background.

17. An image processing apparatus comprising:

a processor for processing foreground image data representing pixels that together form an image of a foreground subject in front of a chroma backing to produce first processed foreground data by varying the data to change the colour of pixels represented thereby so that the data represents pixels that together from a colour-changed image of the foreground subject in front of the chroma backing, and to produce second processed foreground data by offsetting the data so that the data for pixels corresponding to the chroma backing are set to a pedestal level and then varying the thus offset data so that the data represents pixels that together form a colour-altered image of the foreground subject in front of a null backing; and a combiner for combining the first and second processed foreground data, under the control of data representing pixels that together form a first control image, to produce combined foreground data representing pixels that together form an image of a combination of the colour-changed foreground subject and the colour-altered foreground subject in front of the null background.

18. An image processing apparatus comprising:

a first processor for processing foreground image data representing pixels that together form an image of a foreground subject in front of a chroma backing by varying the data to change the colour of pixels represented thereby to produce processed foreground image data representing pixels that together from a colour-changed image of the foreground subject in front of a null backing;

a second processor for processing background image data representing pixels that together form an image of a background to produce processed background image data representing pixels that together form an image of the background with one or more null portions at areas corresponding in position to that of the foreground subject in the image represented by the foreground image data;

an adder for adding the processed foreground data and the processed background data together to produce added data representing pixels that together form an image of the colour-changed foreground subject in front of the background and the null background;

a generator for generating keying data representing pixels that together form a keying image defining one or more areas containing the foreground subject as represented by the added subject data; and a combiner for combining the background image data and the added data under the control of the keying data to produce combined image data representing pixels that together form an image of the colour-changed foreground subject in front of the background.

19. An image processing method comprising:

processing foreground image data representing pixels that together form an image of a foreground subject in front of a chroma backing to produce first processed foreground data representing pixels that together form a colour corrected image of the foreground subject in front of the chroma backing and second processed foreground data representing pixels that together form an image of the foreground subject in front of a null backing;

combining the first and second processed foreground data, under the control of first control data representing pixels that together form a first control image, to produce combined foreground data representing pixels that together form an image of the colour corrected foreground subject in front of the null backing;

processing background image data representing pixels that together form an image of a background, under the control of second control data representing pixels that together form a second control image, to produce processed background image data representing pixels that together form an image of the background with one or more null portions at areas corresponding in position to that of the foreground subject in the image represented by the foreground image data; and adding the combined foreground data and the processed background data together to produce data representing pixels that together form an image of the colour corrected foreground subject in front of the background.

20. An image processing method comprising:

processing foreground image data representing pixels that together form an image of a foreground subject in front of a chroma backing to produce first processed foreground data by varying the data to change the colour of pixels represented thereby so that the data represents pixels that together from a colour-changed image of the foreground subject in front of the chroma backing, and to produce second processed foreground data by offsetting the data so that the data for pixels corresponding to the chroma backing are set to a pedestal level and then varying the thus offset data so that the data represents pixels that together form a colour-altered image of the foreground subject in front of a null backing; and combining the first and second processed foreground data, under the control of data representing pixels that together form a first control image, to produce combined foreground data representing pixels that together form an image of a combination of the colour-changed foreground subject and the colour-altered foreground subject in front of the null background.

21. An image processing method comprising:

processing foreground image data representing pixels that together form an image of a foreground subject in front of a chroma backing by varying the data to change the colour of pixels represented thereby to produce processed foreground image data representing pixels that together from a colour-changed image of the foreground subject in front of a null backing;

processing background image data representing pixels that together form an image of a background to produce processed background image data representing pixels that together form an image of the background with one or more null portions at areas corresponding in position to that of the foreground subject in the image represented by the foreground image data;

adding the processed foreground data and the processed background data together to produce added data representing pixels that together form an image of the colour-changed foreground subject in front of the background and the null background;

generating keying data representing pixels that together form a keying image defining one or more areas containing the foreground subject as represented by the added subject data; and combining the background image data and the added data under the control of the keying data to produce combined image data representing pixels that together form an image of the colour-changed foreground subject in front of the background.

* * * * *